(12) United States Patent
Chung et al.

(10) Patent No.: US 7,446,865 B2
(45) Date of Patent: Nov. 4, 2008

(54) METHOD OF CLASSIFYING DEFECTS

(75) Inventors: Ki-Suk Chung, Seoul (KR);
Chung-Sam Jun, Gyeonggi-do (KR);
Yu-Sin Yang, Seoul (KR); Byung-Sug Lee, Gyeonggi-do (KR); Ji-Young Shin, Seoul (KR); Tae-Sung Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 74 days.

(21) Appl. No.: 11/421,019

(22) Filed: May 30, 2006

(65) Prior Publication Data

US 2007/0041609 A1 Feb. 22, 2007

(30) Foreign Application Priority Data

May 31, 2005 (KR) .................... 10-2005-0046484

(51) Int. Cl.
*G01N 21/00* (2006.01)
(52) U.S. Cl. .................. 356/237.1; 356/237.2
(58) Field of Classification Search .............. None
See application file for complete search history.

(56) References Cited

U.S. PATENT DOCUMENTS 6,791,099 B2 * 9/2004 Some et al. .............. 250/559.4
6,864,971 B2 * 3/2005 Lin et al. .................. 356/237.4

FOREIGN PATENT DOCUMENTS

| JP | 2002-116155 | 4/2002 |
| KR | 1997-7005031 | 9/1997 |
| KR | 2001-0061643 | 7/2001 |
| KR | 2002-0051990 | 7/2002 |
| KR | 2004-0076742 | 9/2004 |

OTHER PUBLICATIONS

English language abstract of Korean Publication No. 2002-0051990.
English language abstract of Korean Publication No. 2004-0076742.
English language abstract of Japanese Publication No. 2002-116155.

* cited by examiner

*Primary Examiner*—Michael P Stafira
(74) *Attorney, Agent, or Firm*—Marger Johnson & McCollom, P.C.

(57) ABSTRACT

A method of classifying defects of an object includes irradiating multi-wavelength light onto the object, splitting light reflected from the object into light beams, each of the light beams having different wavelengths, obtaining image information of the object based on each of the light beams, forming a characteristic matrix that represent the wavelengths and the image information, and analyzing the characteristic matrix to determine types of the defects on the object. Thus, the defects may be accurately classified using a difference between reactivity of each of the defects in accordance with variations of the wavelengths and inspection conditions.

17 Claims, 13 Drawing Sheets

METHOD OF CLASSIFYING DEFECTS

CROSS REFERENCE TO RELATED APPLICATION

This application claims priority under 35 USC § 119 to Korean Patent Application No. 2005-46484, filed on May 31, 2005, the contents of which are herein incorporated by reference in their entirety for all purposes.

BACKGROUND OF THE INVENTION

1. Field of the Invention

The present invention relates to a method of classifying defects. More particularly, the present invention relates to a method of rapidly inspecting and classifying defects such as particles or scratches on an object such as a semiconductor substrate.

2. Description of the Related Arts

A semiconductor fabricating process indispensably requires a process for inspecting detects on an object such as a semiconductor substrate. For example, after forming fine patterns on the semiconductor substrate using a photolithography process, defects such as particles, bridges, or collapses may be generated on these patterns. In addition, scratches may be generated on a surface on the semiconductor substrate after performing a chemical mechanical polishing (CMP) process.

According to a conventional method of inspecting defects, light having a specific wavelength is irradiated onto the object to detect defects. Often the defects are not accurately detected. Further, types of the detected defects are not automatically classified. These problems may be caused by large jumps in data values with respect to the defects in accordance with the diverse shapes of the defects, normal features, or properties of layers on the object. As a result, characteristic information that is to be used for recognizing the defects on the object and for distinguishing the types of the defects is lacking. Thus, the conventional method does not accurately detect defects on the object, and does not automatically classify the types of defects that are detected.

Figure 1:
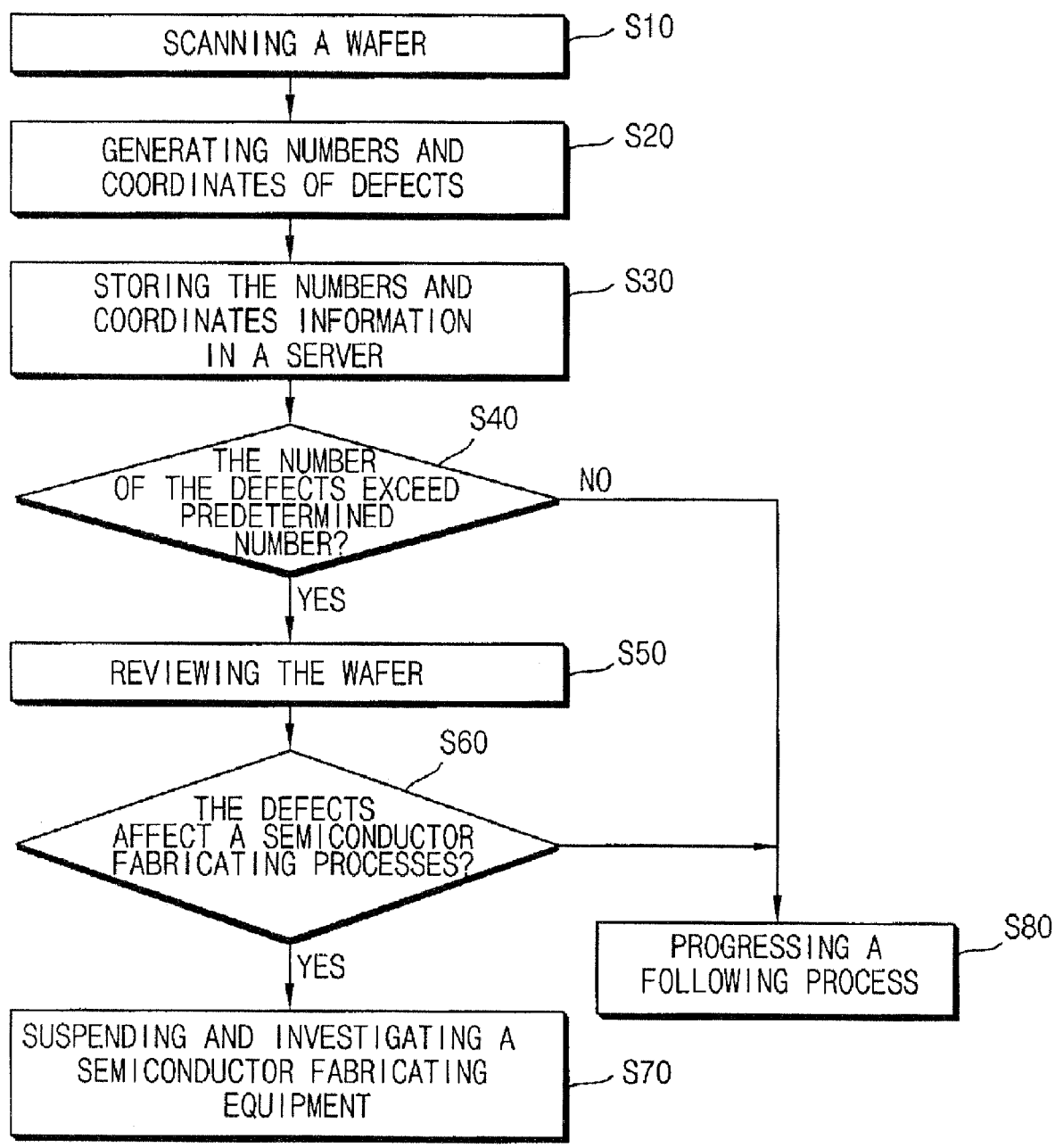

FIG. 1 is a flow chart illustrating a conventional method of classifying defects on an object.

Referring to FIG. 1, in step S10, a defect-inspecting apparatus irradiates light having a specific wavelength onto a surface of a wafer to scan its surface. In step S20, the defect inspecting apparatus obtains information concerning existence, numbers and coordinates of defects on the wafer. In step S30, a server then stores this information.

In step S40, it is determined whether the number of defects exceeds a predetermined allowable number. If so, then the semiconductor's fabricating equipment may be suspended. Subsequently, in step S50, the wafer is transferred to a review tool. The review tool performs a review process on the wafer. Here, the review process corresponds to a process for identifying the shapes and formations of the defects on the wafer by an inspector's eye using the review tool based on the information concerning the defects. Examples of the review tool include a microscope, a scanning electron microscope (SEM), etc.

The review process identifies the types of the defects that exceed the allowable numbers on the wafer and determines whether the defects affect the semiconductor manufacturing processes. In step S60, an inspector directly identifies the defects by the naked eye to determine whether the defects critically affect the semiconductor-manufacturing processes. When the defects on the wafer exceed the allowable numbers, in step S70, the following process is suspended. On the contrary, when the defects on the wafer do not exceed the allowable numbers, in step S80, the following process may begin.

Figure 2:
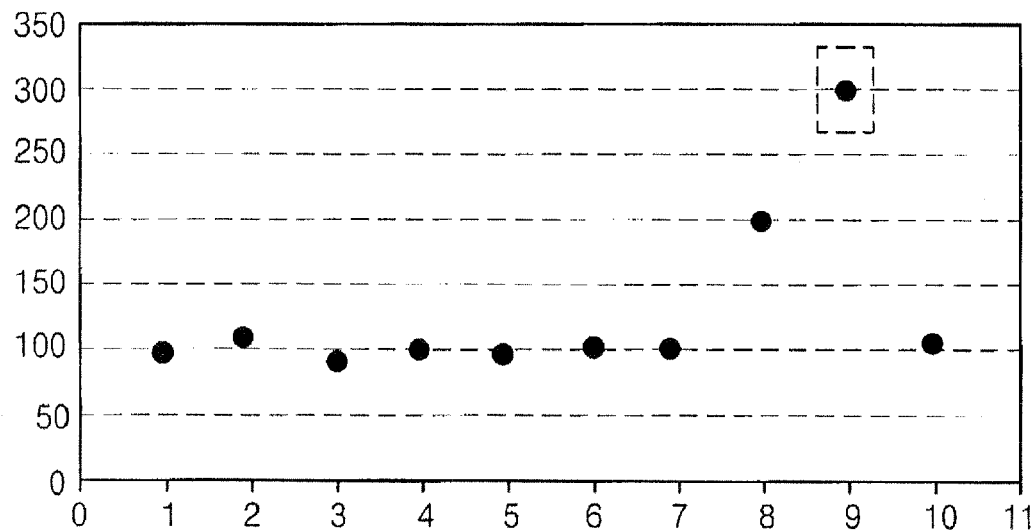
Figure 3:
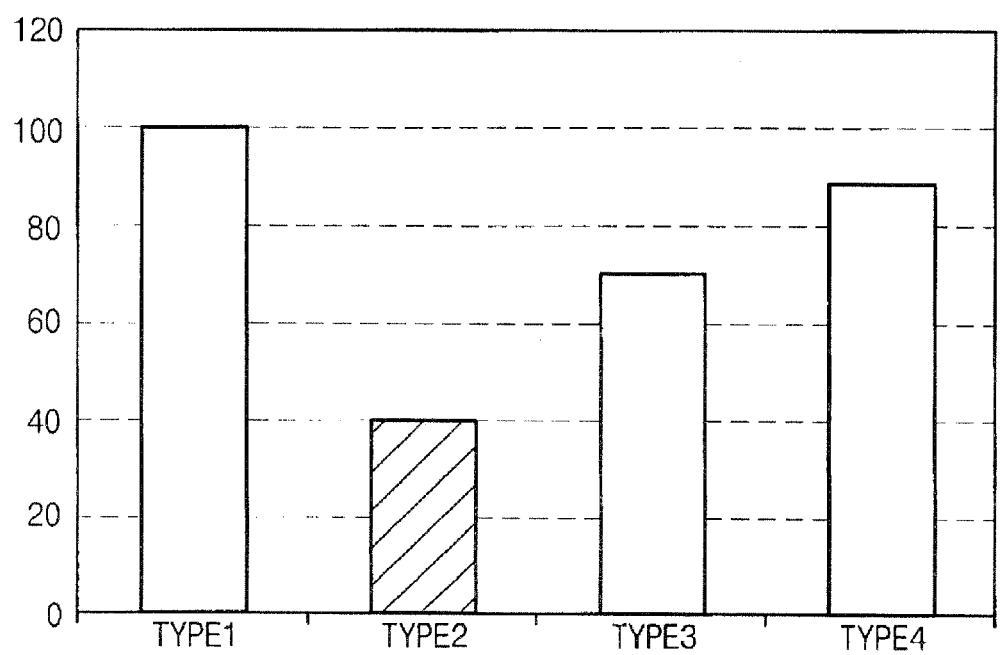

FIGS. 2 and 3 are graphs illustrating a conventional method of classifying defects using a manually reviewing process.

Referring to FIG. 2, when the number of detected defects is beyond a predetermined reference number of about 200, for example, the wafer is reviewed while suspending the subsequent processes.

In the review process, a worker, i.e., the inspector, visually inspects the defects on the wafer. The worker manually classifies the types of the defects, and then inputs the information concerning the classified defects into a server. The types of stored defects are classified as shown in FIG. 3. For example, when defects of a type II correspond to a critical defect, the subsequent process is suspended in accordance with the number of the defects of type II.

In the conventional method, whether the review process is performed is determined in accordance with the number of the defects on the wafer. Thus, when the number of the detected defects is below the reference number and a critical defect is included among the detected defects, the conventional method may not recognize the defect. This case often occurs in semiconductor manufacturing processes. A reference number of the defects may be adjusted in the following processes. In fact, a reference number of the defects may frequently be changed during the course of a number of manufacturing processes.

When the number of defects is in the hundreds or thousands, the review process is too long so that all the defects are not actually classified. Thus, the inspector randomly selects some wafers and reviews the defects on the selected wafers. The inspector speculates on the number and a ratio of the defects by multiplying the reviewed defects by a constant multiple factor. However, since the selected wafer does not accurately represent all the wafers, the conventional method has poor reliability. Furthermore, since the conventional method is dependent upon the subjective judgment of the inspector, the classification of the defects by the manual reviewing process may often lack objectivity.

For example, the conventional inspecting apparatus inspects about 200 to about 300 wafers per day. About 1,400 to 2,100 wafers may be inspected per day in one semiconductor-fabricating line using seven inspecting apparatuses. A small number of wafers are actually reviewed among the inspected wafers. Particularly, since a small number of wafers having many defects are reviewed, defect inspection results have poor accuracy.

Furthermore, since the conventional method uses light having a single wavelength, the defects are not precisely detected. Particularly, the detected defects are not automatically classified.

Figure 4:
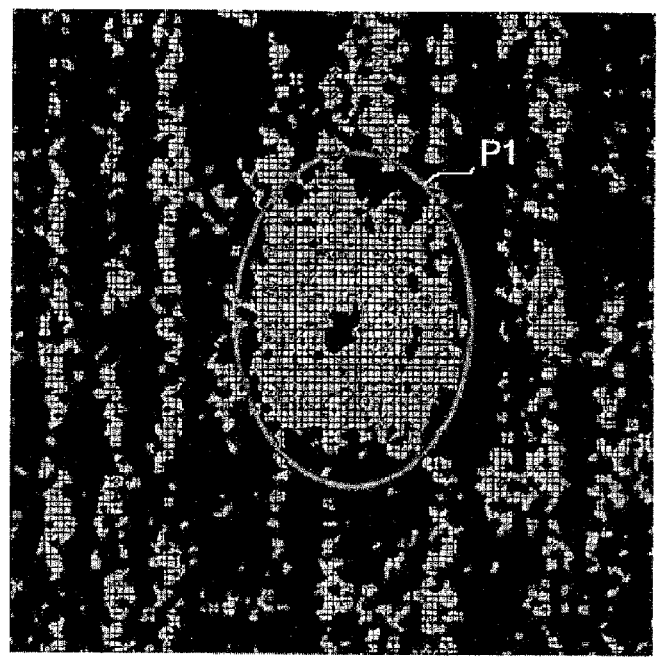
Figure 5:
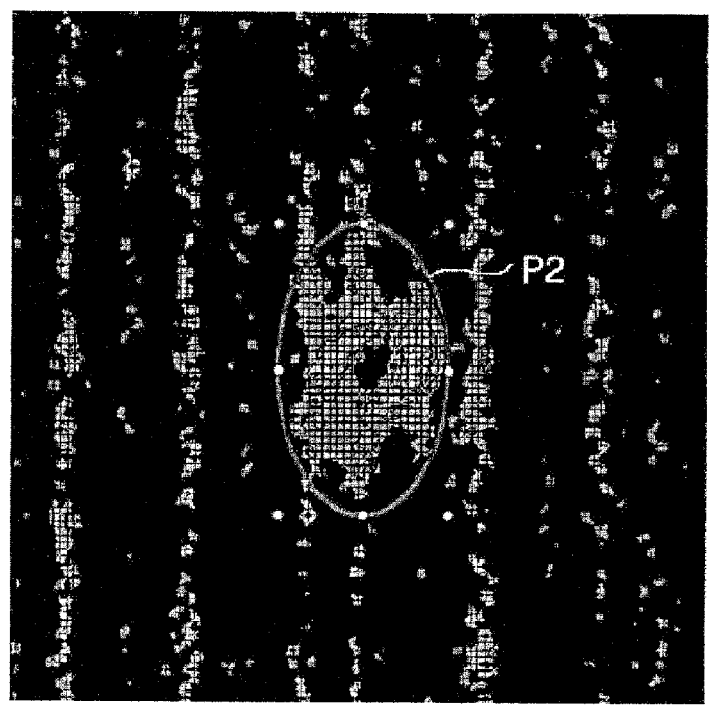
Figure 6:
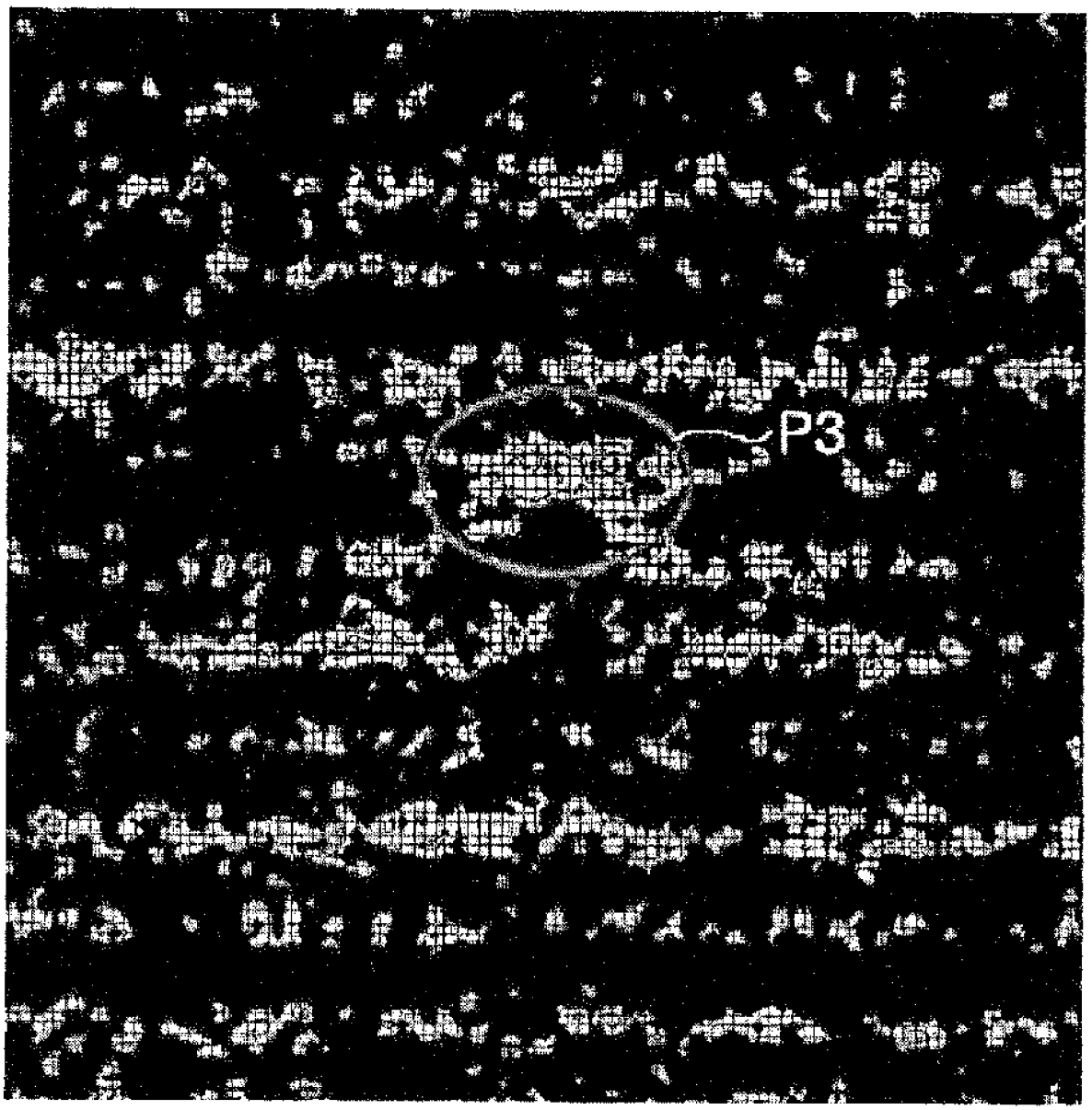

FIG. 4 is a picture illustrating a first image obtained by irradiating red (610 to 700 nm) light onto a particle. FIG. 5 is a picture illustrating a second image obtained by irradiating green (450 to 500 nm) light onto the same particle. FIG. 6 is a picture illustrating a third image obtained by irradiating blue (400 to 450 nm) light onto the particle.

Referring to FIGS. 4 to 6, the first, second and third images P1, P2 and P3 are of the same particle. However, as shown in these figures, although the first, second and third defect images P1, P2 and P3 are of the same particle, the first, second and third images P1, P2 and P3 are quite different from each another.

The size of the third defect image P3 is smaller than that of the second defect image P2, and the size of the second defect image P2 is smaller than that of the first defect image P1. That is, the sizes of the defect images P1, P2 and P3 gradually decrease in accordance with their respective imaging wavelengths. Further, the shapes of the defect images P1, P2 and P3 are also different. Particularly, the first defect image P1 in FIG. 4 has a substantially circular shape. On the contrary, the second defect image P2 in FIG. 5 has a vertically long oval shape, and the third defect image P3 in FIG. 6 has a horizontally long rectangular shape. That is, a width, a height, an area, a slope, etc., of the defect images P1, P2 and P3 varies in accordance with their imaging wavelengths.

Furthermore, the brightness of the first defect image P1 in FIG. 4 and a brightness of the second defect image P2 in FIG. 5 gradually decrease from a peripheral portion of the images to a central portion of the images. However, the third defect image P3 in FIG. 5 does not have the above-mentioned brightness characteristics of the first and second images P1 and P2. Thus, existence of a defect on the third defect image P3 is not distinctly identified.

As described above, the data with respect to the defects varies in accordance with the wavelength of the light so that the defects are not accurately classified using light having a single wavelength. Further, the existence of the defects is not recognized using this light.

To overcome the above-mentioned problems caused by the light having a single wavelength, a method and an apparatus for classifying defects using various polarized light is disclosed in Korean Patent Laid-Open Publication No. 2004-76742. Further, a method and an apparatus for classifying defects using laser beams having different wavelengths are disclosed in Japan Laid-Open Publication No. 2002-116155. However, although above-mentioned Publications disclose techniques for readily detecting defects using various types of light, the Publications fail to disclose techniques for accurately classifying detected defects.

Because the semiconductor device is highly integrated, tens of defects may have typically been on a single substrate in the past, whereas, today, hundreds or thousands of defects are currently generated on the single substrate. However, a method of effectively classifying detected defects has not developed. Thus, a method of effectively classifying defects to increase the productivity of semiconductor device manufacturing is urgently in demand.

SUMMARY OF THE INVENTION

Embodiments of the present invention provide a method of rapidly and accurately detecting and classifying defects on an object.

In accordance with an example embodiment of the present invention, a method of classifying defects of an object includes irradiating a multi-wavelength light beam onto the object, splitting the light beam reflected from the object by wavelengths, obtaining image information of the object based on each of the split light beams, forming a characteristic matrix that represents the wavelengths and the image information, and analyzing the characteristic matrix to determine the types of defects on the object.

According to one example embodiment, the multi-wavelength light beam may include separate light beams, each having different wavelengths that have substantially parallel paths. The reflected light beams may be collected and then split by the wavelengths.

According to another example embodiment, the method may further include moving the object by an interval corresponding to the distance between the light beams to sequentially irradiate the light beams onto a substantially same position on the object.

According to still another example embodiment, the characteristic matrix may be formed by arranging factors, which are included in the image information, by the wavelengths. Here, the factors may include contrasts of the split light beams, polarities of the split light beams, sizes of the defects, statistical value of the split light beams, background information of the object, signal intensity of the split light beams, noise information in the split light beams, and at least two combinations thereof.

According to still another example embodiment, determining the types of the defects may include comparing the characteristic matrix with predetermined reference matrices, selecting a reference matrix among all the reference matrices that is substantially similar to the characteristic matrix, finding a type of a reference defect corresponding to the selected reference matrix, and determining the types of the defects based on the found type of the reference defect. The characteristic matrix may be compared with the predetermined reference matrices using a thumb print algorithm, a nearest neighbor algorithm, a decision tree algorithm, a rule-based classification algorithm or a combination thereof. The reference matrices may be formed by i) irradiating the multi-wavelength light beams onto a first reference defect on a reference object, ii) splitting the light beams reflected from the first reference defect by the wavelength bands to obtain first reference image information, iii) arranging factors, which are included in the first reference image information, by the wavelength bands to form a first reference matrix, and iv) repeating the steps i) to iv) with respect to another reference defect different from the first defect. Here, the factors may include contrasts of the split light beams, polarities of the split light beams, sizes of the reference defects, statistical value of the split light beams, background information of the reference object, signal intensity of the split light, noise information in the split light beams, and at least two combinations thereof. Further, the characteristic matrix may be compared with the predetermined reference matrices comprises comparing at least two column vectors, which are selected among all column vectors in the characteristic matrix, with at least two column vectors that are selected among all column vectors in each of the predetermined reference matrices. Comparing the characteristic matrix with the predetermined reference matrices comprises comparing at least two row vectors, which are selected among all row vectors in the characteristic matrix, with at least two row vectors that are selected among all row vectors in each of the predetermined reference matrices. Determining the types of the defects comprises comparing the predetermined reference matrices with each other to find components in the predetermined reference matrices having substantially the same value, substituting the components with '0' values, eliminating a column or a row having all components that are substituted with the '0' values in the predetermined reference matrices to transform the reference matrices into effective reference matrices, comparing the characteristic matrix with the effective reference matrices, selecting an effective reference matrix among all of the effective reference matrices that is substantially similar to the characteristic matrix, finding a type of a predetermined reference defect corresponding to the selected effective reference matrix, and determining the types of the defects based on the found type of the effective reference defect. Here, comparing the characteristic matrix with the effective reference matrices comprises comparing at least two column vectors, which are selected among all column vectors in the characteristic matrix, with at least two column vectors that are selected among all column vectors in each of the effective reference matrices. Comparing the characteristic matrix with the effective reference matrices comprises comparing at least two row vectors, which are selected among all row vectors in the characteristic matrix, with at least two row vectors that are selected among all row vectors in each of the effective reference matrices. Comparing the characteristic matrix with the effective reference matrices comprises comparing, obtaining an eigenvalue and an eigenvector from the characteristic matrix, obtaining an eigenvalue and an eigenvector from each of the effective reference matrices and comparing the eigenvalue and the eigenvector obtained from the characteristic matrix with the eigenvalue and the eigenvector obtained from each of the effective reference matrices.

DESCRIPTION OF THE PREFERRED EMBODIMENT

The present invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this closure will be thorough and complete, and will fully convey the scope of the invention to those skilled in the art.

Hereinafter, embodiments of a method of classifying defects are described in detail.

Figure 7:
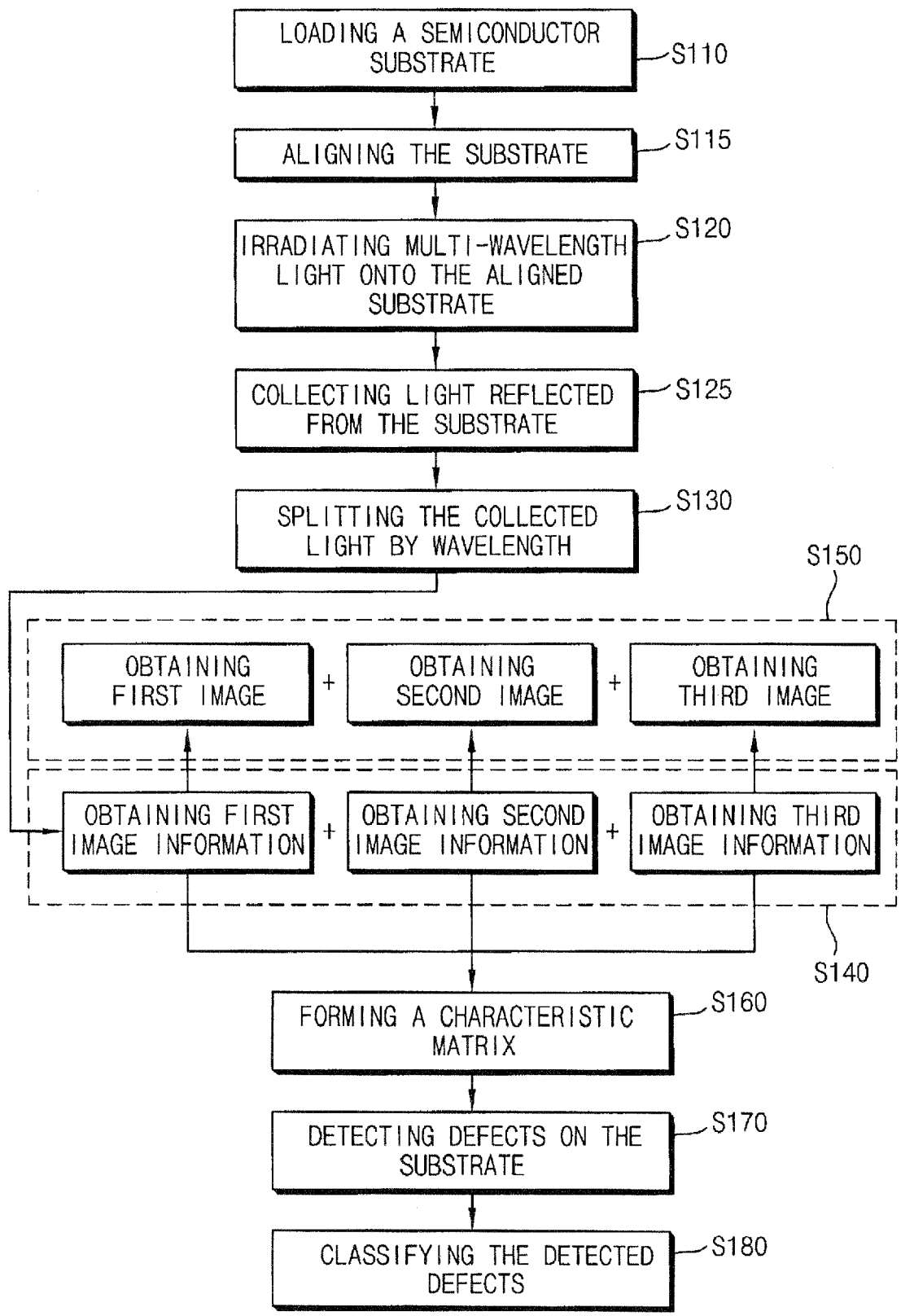

FIG. 7 is a flow chart illustrating a method of classifying defects in accordance with an example embodiment of the present invention.

Referring to FIG. 7, in step S110, a semiconductor substrate, such as a wafer, is loaded onto a stage. In step S115, the substrate is aligned into a measurement position. In step S120, multi-wavelength light is irradiated onto the aligned substrate. In step S125, light reflected from the substrate is collected. In step S130, the collected light is split according to wavelength into split light beams, each having a substantially different wavelength, or wavelength range. In step S140, image information is obtained from each of the split light beams. In step S150, an image of the substrate may be obtained based on the image information. In step S160, factors included in the image information are arranged in a characteristic matrix by wavelengths of the collected light beams. In step S170, the characteristic matrix is analyzed to detect defects on the substrate. In step S180, the detected defects are classified by types of the defects.

The multi-wavelength light may be generated by various methods. For example, the multi-wavelength light may include UV light and WV light. Particularly, the multi-wavelength light may include 258 nm DUV light, 365 nm SUV light, 350~450 nm BBUV light, 365~600 nm WL light, and 500~600 nm WLR light. The multi-wavelength light may be generated from one light source. Alternatively, the multi-wavelength light may be generated from a group of various light sources. The multi-wavelength light may have many different forms. For example, the multi-wavelength light may only include light having a specific wavelength such as light having a 532 nm wavelength. However, defects on the substrate may not be detected using the light having a specific wavelength. Alternatively, the multi-wavelength light may include light generated from one light source and having a wavelength of about 250 to about 600 nm, for example.

The multi-wavelength light may be irradiated onto the substrate in various ways in accordance with the type of the multi-wavelength light and methods of collecting the reflected light. Defects on the substrate may be detected using a combination of various defect inspection apparatuses in which different wavelengths and inspection conditions are set, respectively. Alternatively, the defects may be detected using one defect inspection apparatus in which different wavelength and inspection conditions are set.

Methods of irradiating the multi-wavelength light and collecting the light reflected from the substrate will now be described more fully hereinafter with reference to FIGS. 8 to 12. The invention may, however, be embodied in different forms and should not be construed as limited to the example embodiments set forth herein.

Figure 8:
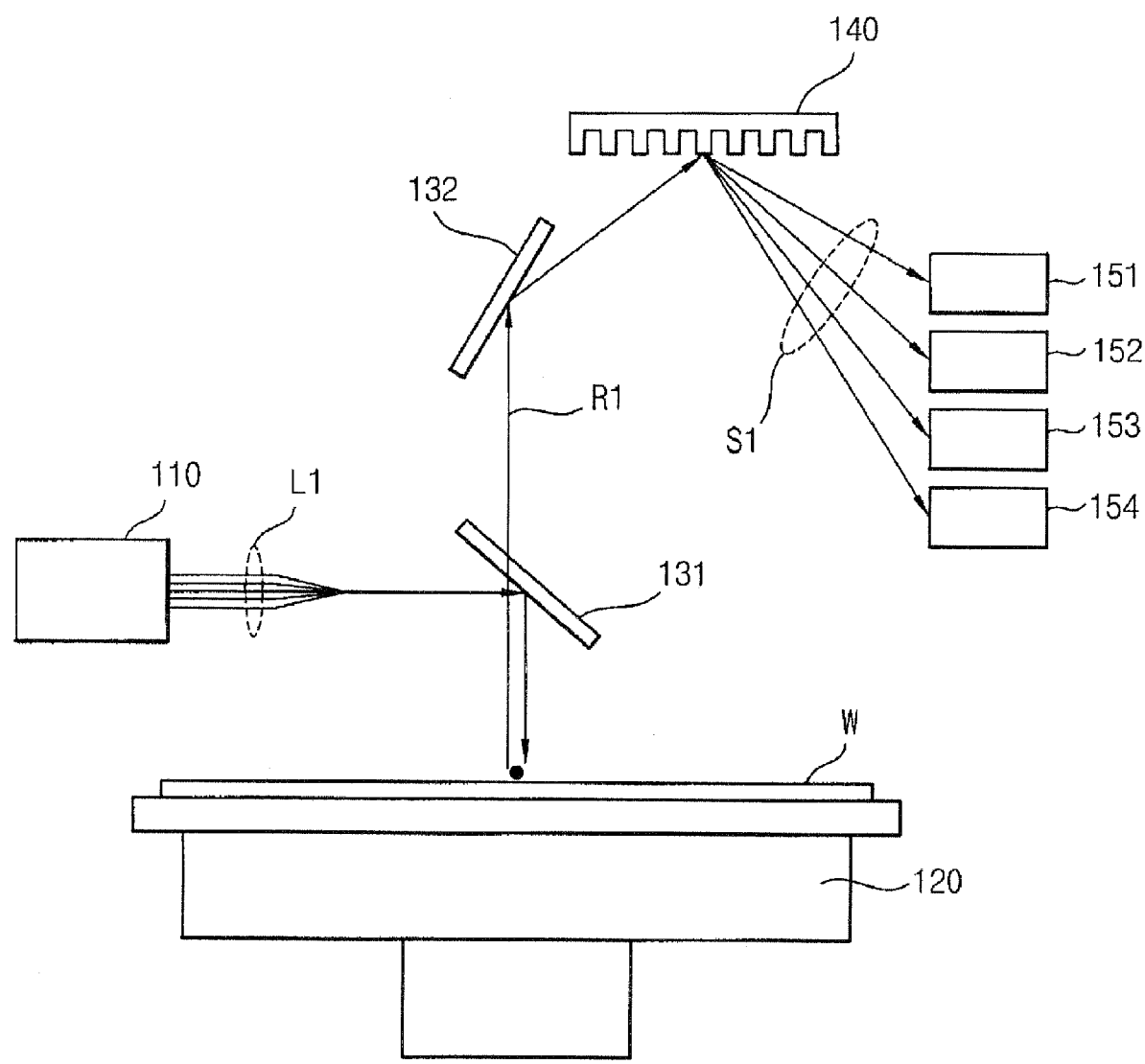

FIG. 8 is a front view illustrating an apparatus for classifying the defects on the substrate using the multi-wavelength light in FIG. 7 according to an embodiment of the present invention. Although direction descriptions such as horizontal, downward, front, and so on are included in this and other example embodiments herein, the embodiments of the invention are not limited to such specific directions and their interrelations.

Referring to FIG. 8, a light source 110 horizontally radiates light L1 having a UV wavelength and a WL wavelength toward a first mirror 131. The light L1 is reflected from the first mirror 131 in a downward direction. The light L1 is irradiated onto a substrate W on a stage 120. The light L1 is then reflected from the substrate W. The reflected light R1 has characteristics corresponding to those of an inspection spot on the substrate W. All of the reflected light R1 from the substrate W may be reflected from a second mirror 132. The reflected light R1 from the second mirror 132 is concentrated onto a grating 140. The concentrated light is then split into respective wavelengths or wavelength ranges. The splitting of light into its composite wavelengths by a grating is well known to one familiar with the art. As such, one would also know that the light's angle of incidence onto the grating 140 may be adjusted to control the splitting of the light, and this may include altering the angle of the diffraction grating 140 itself. Thus, the concentrated light may be split into light having desired wavelengths and desired intensities.

The light S1 split into each wavelength (hereinafter, referred to as split light beams) are concentrated and respectfully collected onto photo detectors 151, 152, 153 and 154 that may include TDIS (Time Delay and Integration). The number of split light beams S I and the number of photo detectors 151, 152, 153 and 154 may not be equal to each other. When the number of photo detectors 151, 152, 153 and 154 is less than that of the split light beams S1, a specific wavelength light may be split from the split light SI by moving the photo detectors 151, 152, 153 and 154.

Figure 9:
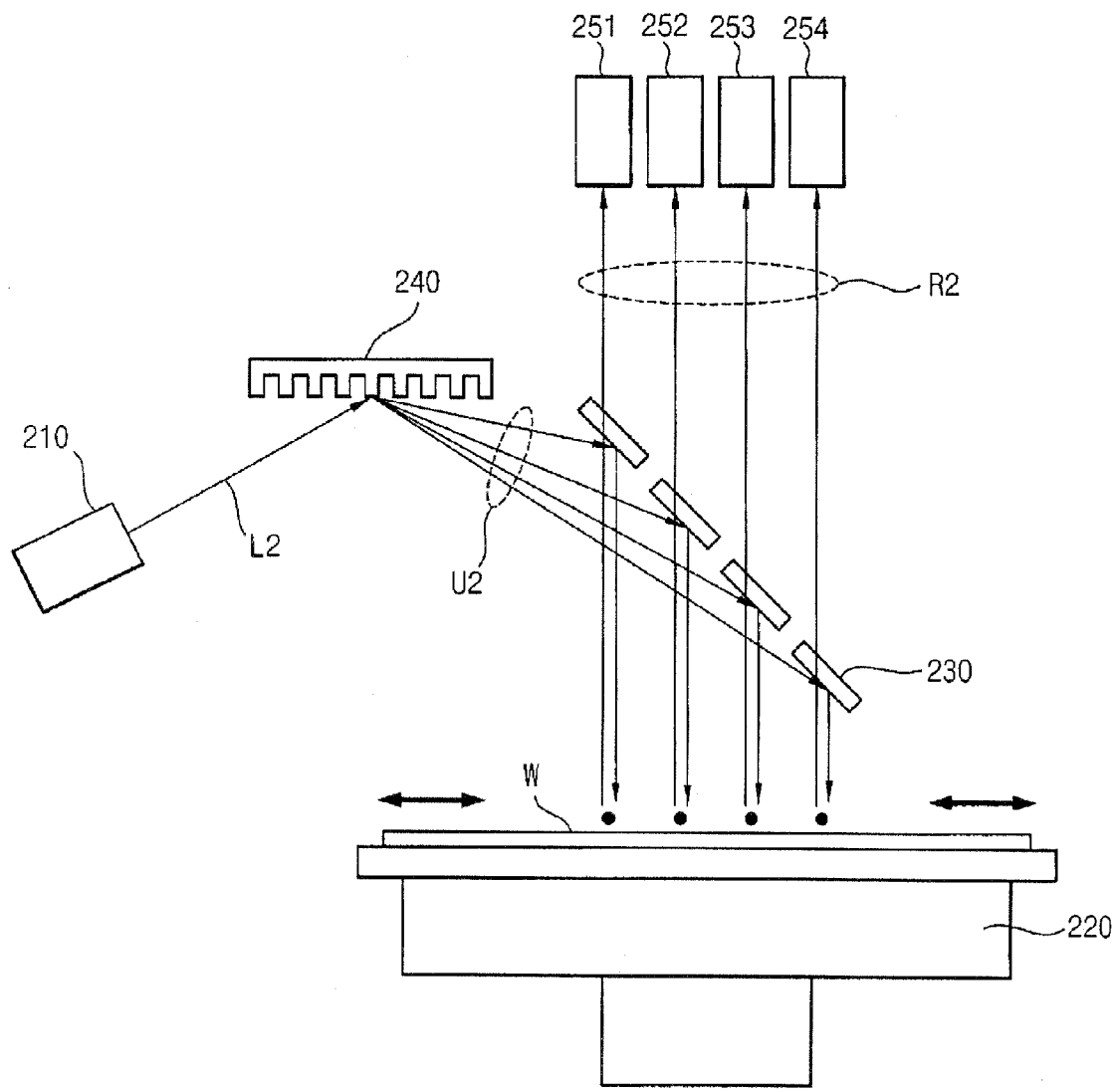

FIG. 9 is a front view illustrating an apparatus for classifying the defects on the substrate using the multi-wavelength light in FIG. 7 according to another embodiment of the present invention.

Referring to FIG. 9, a light source 210 generates multi-wavelength light L2 toward a grating 240. The multi-wavelength light L2 is reflected from the grating 240. The multi-wavelength light L2 is then split into single wavelength light beams U2 (hereinafter, referred to as simply light beams). The multi-wavelength light L2 may be split into the light beams U2 having desired wavelengths and desired intensities by altering the incident angle of the light beam U2 with the grating 240.

The light beams U2 are reflected from the mirrors 230, respectively. The mirrors 230 are independent of each other. The light beams U2 from the mirrors 230 are vertically irradiated onto a substrate W on a stage 220. The light beams U2 are respectively irradiated onto inspection spots of the substrate W. Thus, each of the light beams U2 has characteristics respectively corresponding to each of the inspection spots on the substrate W. All of the reflected light beams R2 reflected from the substrate W are concentrated and collected on photo detectors 251, 252, 253 and 254, respectively. Alternatively, the light beams U2 may be sequentially irradiated onto the same inspection spot on the substrate W by moving the stage 220 on which the substrate W is placed. Here, the stage 220 may be moved by an interval substantially the same as that between the light beams U2.

Figure 10:
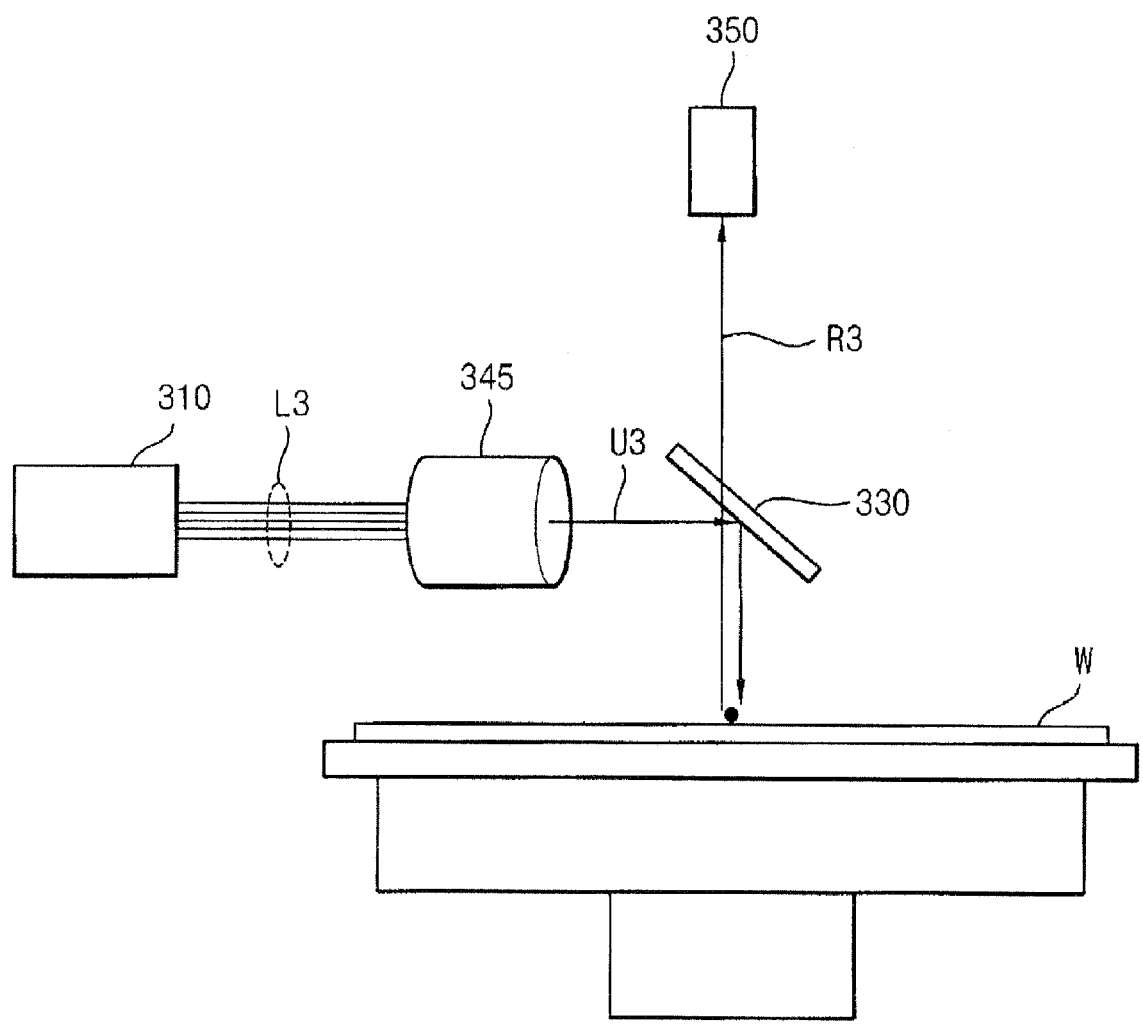

FIG. 10 is a front view illustrating an apparatus for classifying the defects on the substrate using the multi-wavelength light in FIG. 7 according to further embodiment of the present invention.

Referring to FIG. 10, a multi-wavelength light L3 generated from a light source 310 is concentrated on a filter 345 to transmit light U3 having a first wavelength from the multi-wavelength light L3. The light U3 is vertically irradiated onto a substrate W using a mirror 330. The light U3 is then reflected from the substrate W, and then the light U3 has characteristics corresponding to those of an inspection spot on the substrate W. A reflected light R3 reflected from the substrate W is concentrated and collected on a photo detector 350.

Light U3 having a second wavelength is split from the multi-wavelength light L3 by controlling the filter 345. The above-mentioned processes are repeated. According to this example embodiment of the present invention, light beams having various wavelengths may be sequentially irradiated onto the substrate W without much remodeling of a conventional defect classification apparatus.

Figure 11:
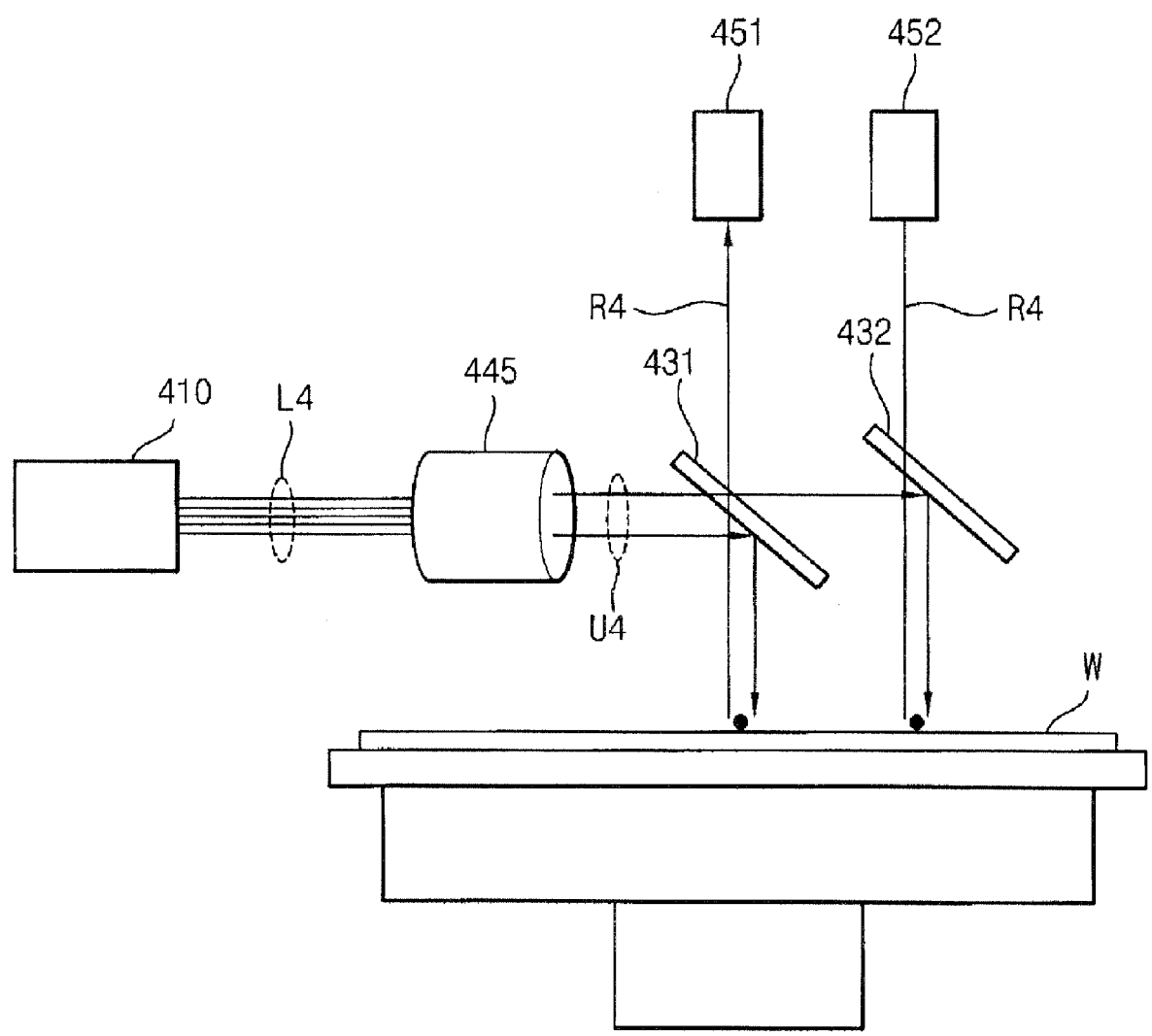

FIG. 11 is a front view illustrating an apparatus for classifying the defects on the substrate using the multi-wavelength light in FIG. 7 according to another embodiment of the present invention.

Referring to FIG. 11, a multi-wavelength light L4 generated from a light source 410 is concentrated on a filter 445 to transmit two light beams U4 having first and second wavelengths from the multi-wavelength light L4. For example, the multi-wavelength light L4 may include UV wavelengths and WV wavelengths. The two light beams U4 are irradiated onto a substrate W using first and second mirrors 431 and 432, respectively. The two light beams U4 are irradiated on different inspection spots of the substrate W, respectively. Each of the light beams U4 is, in general, differently reflected from the substrate W. Thus, each of the light beams U4 has characteristics corresponding to those of the inspection spots. All of the reflected light R4 reflected from the substrate W is concentrated and collected on photo detectors 451 and 452.

Referring now again to FIG. 7, in step S125, the multi-wavelength light reflected from the substrate is collected. In step S130, the collected light is split according to wavelength. As illustrated in FIGS. 9 to 11, the multi-wavelength light is reflected from the substrate W and split into light by each wavelength. The multi-wavelength light may be reflected and split at substantially the same time.

In step S140, image information is obtained from each of the split light. The image information includes all kind of information needed to make an image of the inspection spot. The image information may include every kind of information obtained from the reflected light. For example, the image information may include contrast information, polarity information, size information, statistical value information, background information, signal intensity information, and noise information of the reflected light, or combination thereof. Each image information may include sub information or a combination thereof.

In step S160, factors having the image information are arranged in a characteristic matrix by wavelengths. For example, the image information may be represented by the following Equation 1 in an N×M matrix. The image information has M factors (f1 to fm) for each of the N wavelengths ($\lambda 1$ to $\lambda n$). Here, the Equation 1 (FM) is formed with elements (fnm$\lambda$n).

$$FM = \begin{bmatrix} f11\lambda 1 & f12\lambda 2 & f13\lambda 3 & \ldots & f1m\lambda n \\ f21\lambda 1 & f22\lambda 2 & f23\lambda 3 & & \\ f31\lambda 1 & f32\lambda 2 & f33\lambda 3 & & \\ \vdots & & & \ddots & \\ fn1\lambda 1 & fn2\lambda 2 & fn3\lambda 3 & \ldots & fnm\lambda m \end{bmatrix} \quad \text{Equation 1}$$

In step S170, defects that exist on the substrate are detected by comparing the characteristic matrix with reference matrices. In step S180, the detected defects are classified by type.

Image information is obtained from every type of reference defects. Factors comprising the image information are arranged in the reference matrices by wavelengths. The image information may be obtained in the same manner as the method of obtaining the image of the substrate.

Figure 12:
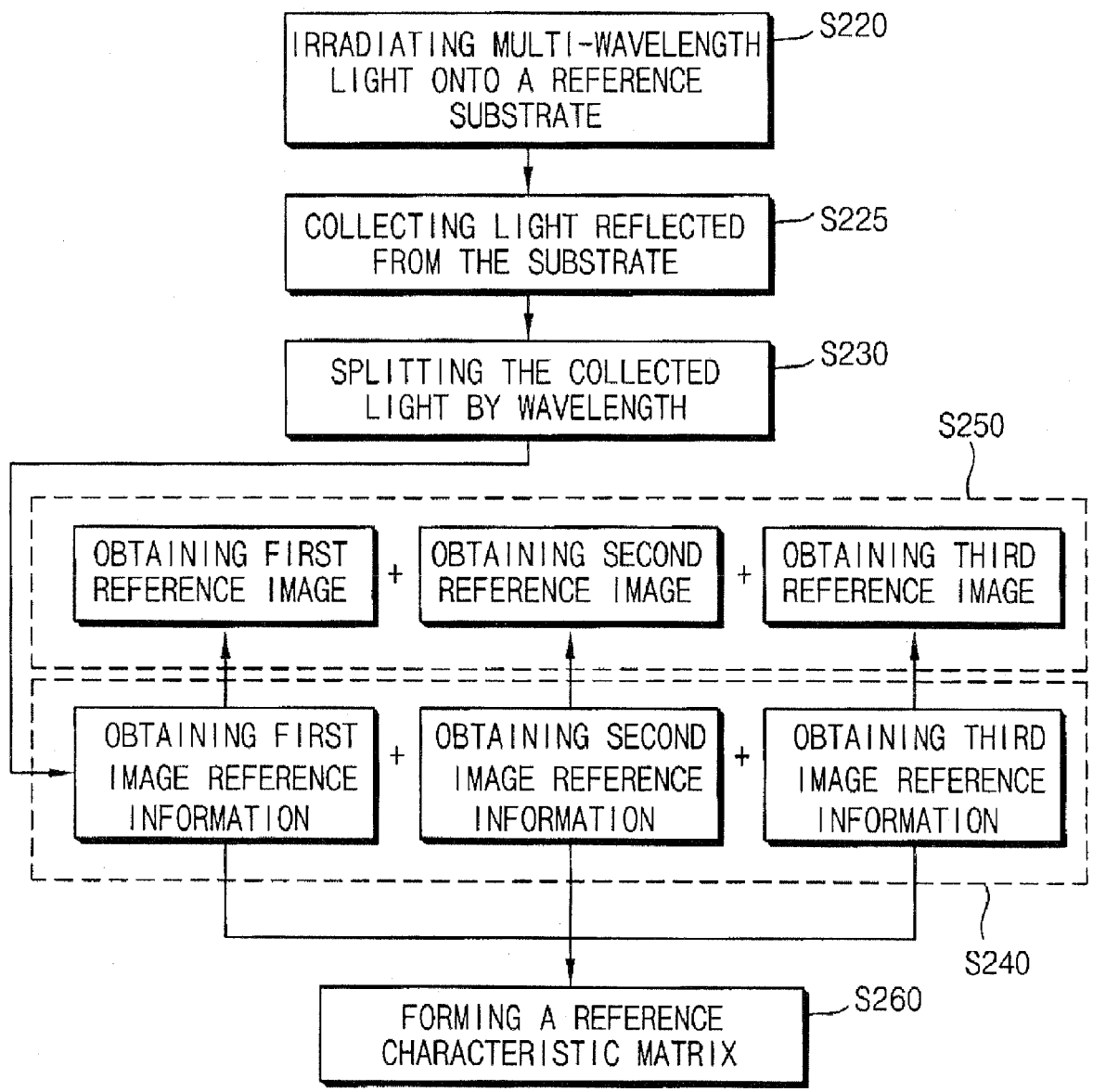

FIG. 12 is a flow chart illustrating a method of obtaining a reference matrix that is to be compared with the characteristic matrix in FIG. 7.

Referring to FIG. 12, each of the reference matrices is obtained by performing the same steps in the flow chart in FIG. 7. In step S220, a multi-wavelength light is irradiated onto a first reference defect selected among reference defects. In step S225, light reflected from the first reference defect is collected. In step 230, the collected light is split by each wavelength. In step S240, a first reference image is obtained from each of the split light beams, respectively. In step S250, the first reference defect image may be obtained based on the first image information. In step S260, a first reference matrix is obtained by arranging factors that are included in the first reference image information. The other reference matrices may be formed in a same manner as that described above.

The reference matrix (SM) may be represented in an N×M matrix like as in the following Equation 2. Here, M factors (f1 to fm) are arranged by each of N wavelengths ($\lambda 1$ to $\lambda n$) in the Equation 2 (SM).

$$SM = \begin{bmatrix} f11\lambda 1 & f12\lambda 2 & f13\lambda 3 & \ldots & f1m\lambda n \\ f21\lambda 1 & f22\lambda 2 & f23\lambda 3 & & \\ f31\lambda 1 & f32\lambda 2 & f33\lambda 3 & & \\ \vdots & & & \ddots & \\ fn1\lambda 1 & fn2\lambda 2 & fn3\lambda 3 & \ldots & fnm\lambda m \end{bmatrix} \quad \text{Equation 2}$$

The multi-wavelength light irradiated onto the reference defect and the multi-wavelength light irradiated onto the substrate may be substantially equal to each other. The factors in the reference image information are substantially the same as those in the substrate image information. Thus, each of the reference matrices may correspond to an N×M matrix form when the characteristic matrix has N×M matrix form.

The number of the reference matrices may be substantially equal to that of types of defects on the substrate. Various types of defects may exist on the substrate. For example, the defects include voids, bridges, particles, scratches, particle collapses, etc. To accurately classify the defects, the number of the reference matrices may preferably be same as that of the types of the defects.

Characteristic vectors are obtained from the reference matrix. When the reference matrix has an N×M matrix form, N row vectors and M column vectors may be obtained from the reference matrix. The row vectors and the column vectors are the characteristic vectors correspond to the characteristic vectors. Other characteristic vectors may be obtained from the characteristic matrix in the same manner as that for obtaining the characteristic vectors from the reference matrix.

In step 170 and 180, in FIG. 7, the defects on the substrate are detected and classified by comparing the characteristic vectors of the characteristic matrix (hereinafter, referred to as characteristic inspection vectors) with the characteristic vectors of the reference matrix (hereinafter, referred to as characteristic reference vectors).

To detect and classify the defects, more than two characteristic inspection vectors are obtained from the characteristic matrix. All of the characteristic inspection vectors may correspond to row vectors. On the contrary, every characteristic inspection vectors may also correspond to column vectors. The characteristic reference vectors corresponding to characteristic inspection vectors are then obtained from the each of the reference matrices. For example, the characteristic reference vectors include first, third and forth row vectors, respectively, when the characteristic inspection vectors include first, third and forth row vectors, respectively.

Figure 13:
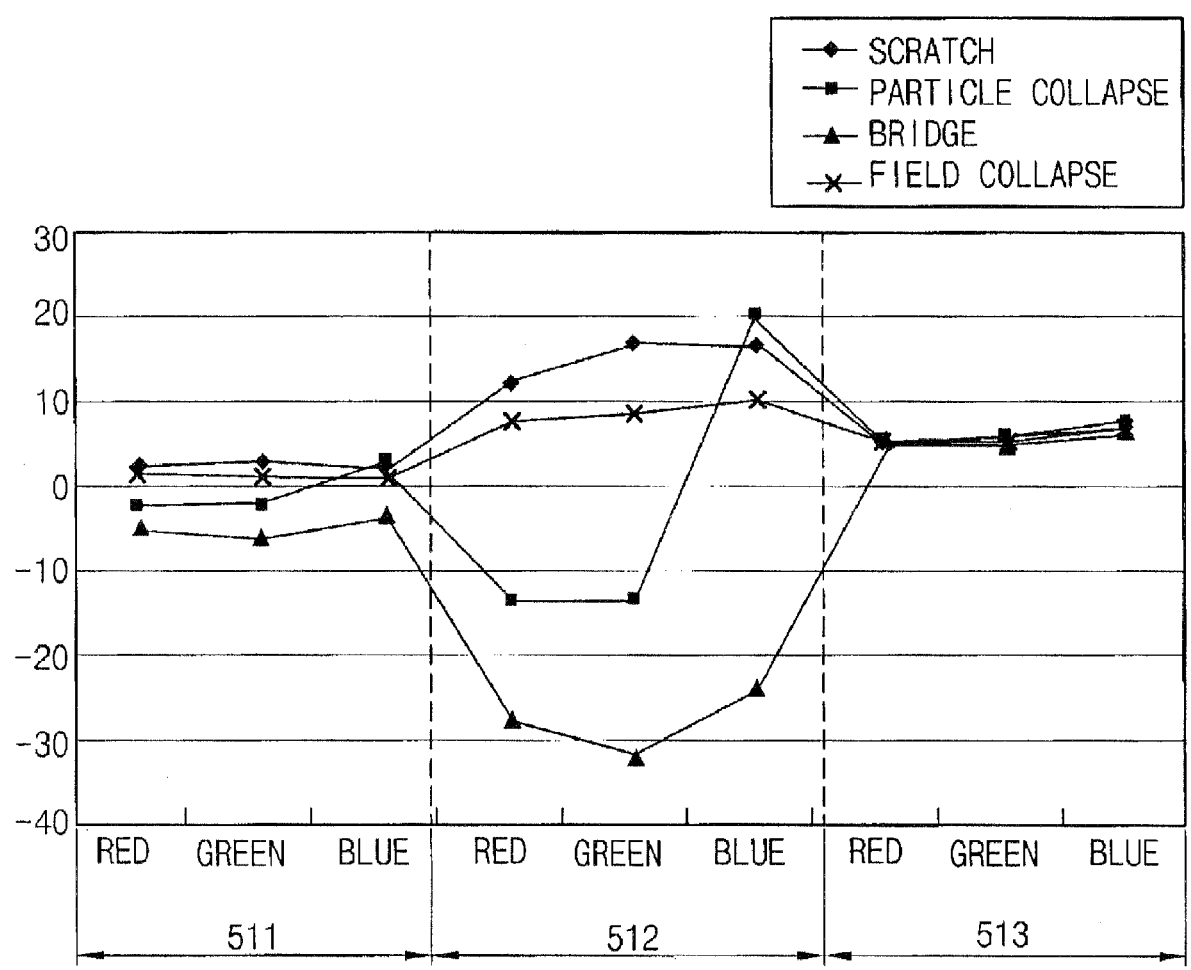

All of the characteristic inspection vectors and the characteristic reference vectors may be illustrated on the graphs in FIG. 13 by each defect.

FIG. 13 is a graph illustrating a method of detecting and classifying defects in accordance with one embodiment of the present invention.

Referring to FIG. 13, three column vectors are respectively selected from three reference matrices. Each of the three column vectors is represented as a line in FIG. 13 by each wavelength. The reference matrices include a first reference matrix related to the scratch, a second reference matrix related to the particle collapse, a third reference matrix related to the bridge, and a fourth reference matrix related to the field collapse. A first column vector of the three column vectors is a characteristic reference vector related to signal to a noise (S/N) ratio factor. A second column vector of the three column vectors is a characteristic reference vector related to a signal intensity factor. A third column vector of the three column vectors is a characteristic reference vector related to a noise factor. Wavelengths in FIG. 13 include red, green, and blue wavelengths. The graph in FIG. 13 is illustrated to explain example methods of detecting and classifying defects. However, this invention should not be construed as limited to graphs in FIG. 13.

All of the first column vectors by the defects are illustrated in a first region 511 of the graph in FIG. 13. All of the second column vectors by the defects are illustrated in a second region 512 in FIG. 13. All of the third column vectors by the defects are illustrated in a third region 513 in FIG. 13.

In the first region 511, the four lines in the red and green wavelength sections are substantially similar to one another. However, the four lines in the blue wavelength section are much different from one another compared to those in the red and green wavelength sections.

In the second region 512, the four lines in the red and green wavelength sections are much different from one another. However, the four lines in the blue wavelength section are substantially similar to one another compared to those in the red and green wavelength sections.

In the third region 513, the four lines in the red, green, and blue wavelength sections are substantially similar.

As described above, the characteristic reference vectors have some characteristics that represent the kinds of defects and the wavelengths. When characteristic inspection vectors related to one inspected defect vary substantially equal or similar to alternations of the characteristic reference vector related to the bridge in the first, second, and third regions 511, 512 and 513, the one inspected defect may be determined to correspond to the bridge. That is, image information obtained by inspecting the substrate includes information with respect to the bridge, and the one inspected defect on the substrate corresponds to the bridge.

Identity or similarity between the characteristic reference vectors and the characteristic inspection vectors may be judged using various pattern classification algorithms. For example, the pattern classification algorithms include a thumb print algorithm, a nearest neighbor algorithm, a decision tree algorithm, a rule-based classification algorithm, or a combination thereof. Alternatively, the pattern classification algorithms may include other algorithms.

In the above-mentioned comparing methods, whether the characteristic vectors exist within a predetermined error range from the characteristic reference vectors is recognized to determine the identity or the similarity. Since persons skilled in the art readily understand the comparing methods, any further illustrations with respect to the comparing methods are omitted herein.

The characteristic reference vectors are then converted into a database. For example, the database may be shown as lines on the graphs in FIGS. 14 to 17.

Figure 14:
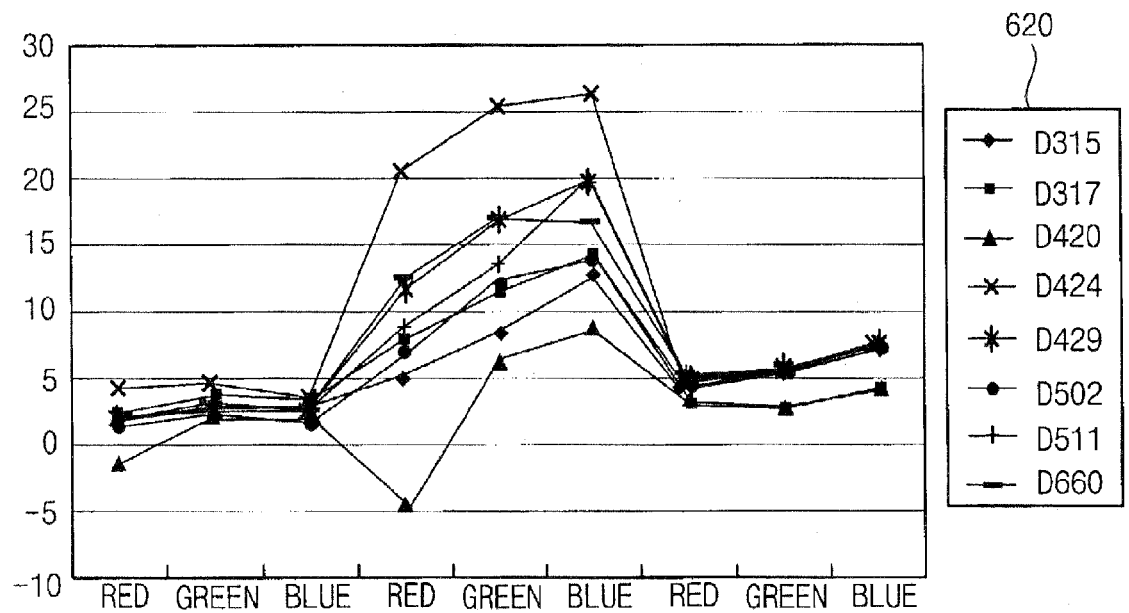
Figure 15:
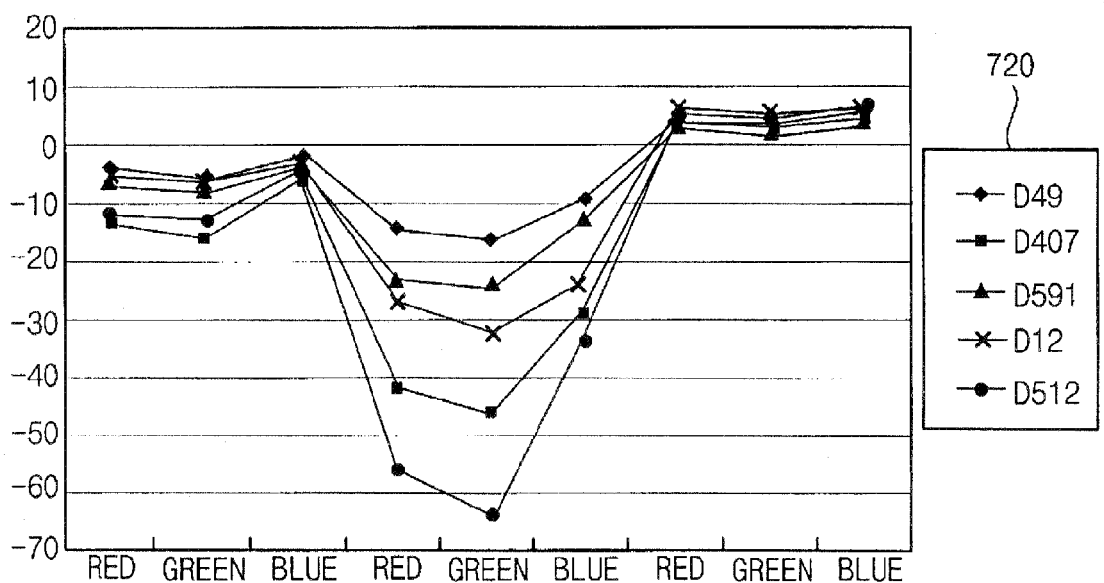
Figure 16:
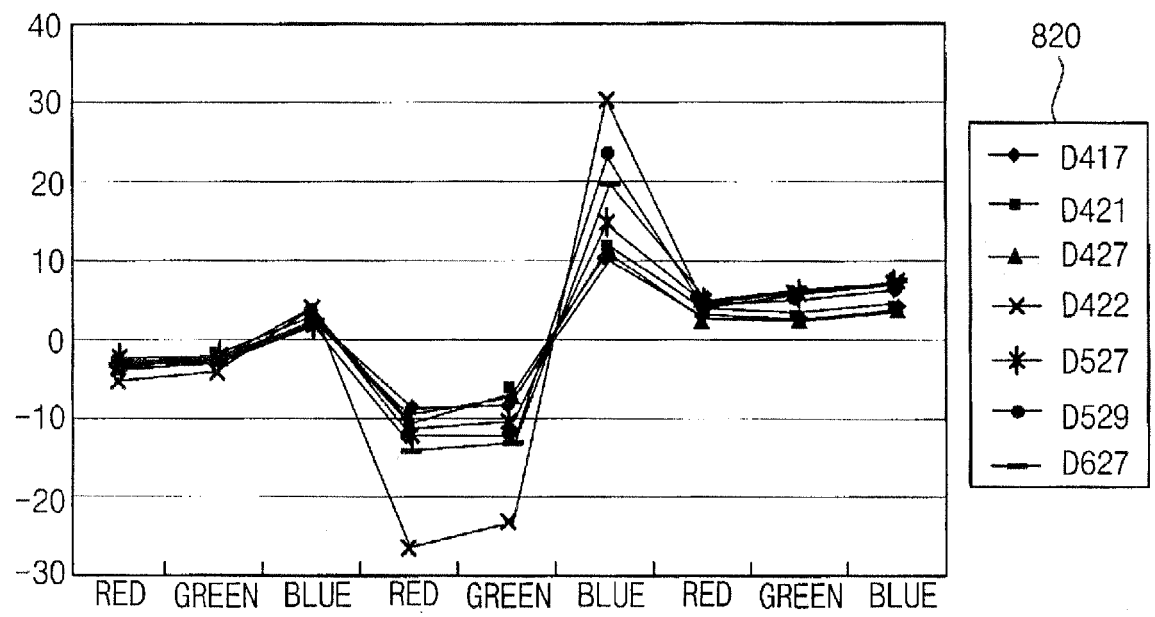
Figure 17:
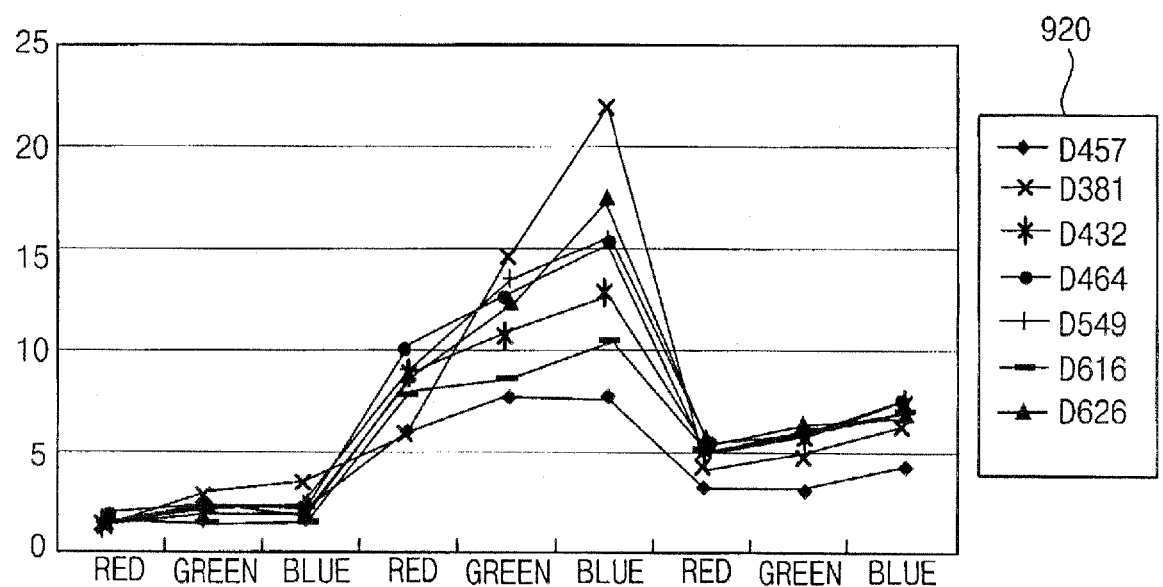

FIG. 14 is a graph illustrating a database in accordance with one embodiment of the present invention. FIG. 15 is a graph illustrating a database in accordance with another embodiment of the present invention. FIG. 16 is a graph illustrating a database in accordance with still another embodiment of the present invention. FIG. 17 is a graph illustrating a database in accordance with yet another embodiment of the present invention.

Referring to FIG. 14, reference matrices related to reference scratches 620 are formed by inspecting each of the reference scratches 620. Characteristic reference vectors are selected from each of the reference matrices. The selected characteristic reference vectors are illustrated in FIG. 14 by wavelengths.

Referring to FIG. 15, reference matrices related to reference bridges 720 are formed by inspecting each of the reference bridges 720. Characteristic reference vectors are selected from each of the reference matrices. The selected characteristic reference vectors are illustrated in FIG. 15 by wavelengths.

Referring to FIG. 16, reference matrices related to reference particle collapses 820 are formed by inspecting each of the reference particle collapses 820. Characteristic reference vectors are selected from each of the reference matrices. The selected characteristic reference vectors are illustrated in FIG. 16 by wavelengths.

Referring to FIG. 17, reference matrices related to reference field collapses 920 are formed by inspecting each of the field collapses 920. Characteristic reference vectors are selected from each of the reference matrices. The selected characteristic reference vectors are illustrated in FIG. 17 by wavelengths.

As shown in FIGS. 14 to 17, when the characteristic reference vectors are converted into the database, whether an arbitrary characteristic inspection vector represents a corresponding defect may be determined easily and accurately by using the database. Thus, every defect on the substrate is easily and accurately classified by using the database of the characteristic reference vectors.

Referring now again to FIG. 13, three variables may exist on the graph in FIG. 13. A first variable is the characteristic vector, a second variable is the wavelength, and a third variable is the type of the defect.

The characteristic reference vectors and the characteristic inspection vectors may be illustrated as a three-dimensional graph using the three variables. When information of each of the characteristic reference vectors related to each of the corresponding reference defects is shown on the three-dimensional graph, whether an arbitrary characteristic inspection vector represents a corresponding defect may be determined easily and accurately based on the three-dimensional graph.

In the above-mentioned methods of detecting and classifying the defects, the characteristic matrix with respect to a defect is compared with all the reference matrices to find a reference matrix among all the reference matrices substantially equal or similar to the characteristic matrix. The kind of defect on the substrate is determined based on the reference matrix. Thus, it is very important to effectively compare the characteristic matrices with the reference matrices. To perform the effective comparison, the reference matrices may be preferably converted into effective reference matrices.

Hereinafter, a method of transforming the reference matrices into the effective reference matrices is illustrated in detail.

To transform the reference matrices into the effective reference matrices, the reference matrices are formed by each of the reference defects. Here, the reference matrices may be arranged in the N×M matrix form of the Equation 2.

The reference matrices are then compared to each other. At least one unchanged component among all the components in the reference matrices is found.

For example, when light beams having substantially the same wavelength are respectively irradiated onto the first and second defects, the reference matrices with respect to the first and second reference image information may have at least one unchanged factor. The unchanged factor is not suitable for factors that are used for classifying the first and the second defects. Thus, the unchanged factor may be excluded in classifying the defects. The reference matrices are compared to each other. The unchanged factor in the reference matrices is substituted with a '0' value in accordance with comparison results to form a substituted reference matrix. That is, all of elements in the unchanged factor are substituted with a '0' value. In this case, the reference matrices are compared to each other with a one to one relation. Alternatively, the reference matrices may be compared to one another without using a one to one relation. The substituted reference matrix having the substituted factor may be formed as in the following Equation 3.

$$SM = \begin{bmatrix} f11\lambda1 & 0 & f13\lambda3 & f14\lambda4 & \ldots & f1m\lambda n \\ f21\lambda1 & 0 & f23\lambda3 & f24\lambda4 & & \\ 0 & 0 & 0 & 0 & \ldots & 0 \\ f41\lambda1 & \vdots & f43\lambda3 & f44\lambda4 & & \\ \vdots & \vdots & & & \ddots & \\ fn1\lambda1 & 0 & fn3\lambda3 & \ldots & \ldots & fnm\lambda m \end{bmatrix} \quad \text{Equation 3}$$

Alternatively, two pairs of the reference matrices may be compared to each other. Further, all reference matrices may be simultaneously compared to one another.

If a reference matrix has a row or a column in which all of the components are substituted '0' value, the row or the column is eliminated from the reference matrix to form the effective reference matrix that has an N'×M' matrix form in Equation 4.

$$SM' = \begin{bmatrix} f11\lambda1 & f13\lambda3 & f14\lambda4 & \ldots & f1m\lambda n \\ f21\lambda1 & f23\lambda3 & f24\lambda4 & & \\ f41\lambda1 & f43\lambda3 & f44\lambda4 & & \\ \vdots & & & \ddots & \\ fn1\lambda1 & fn3\lambda3 & \ldots & \ldots & fnm\lambda m \end{bmatrix} \quad \text{Equation 4}$$

As shown in Equation 4, when the reference matrix (SM) is transformed into the effective reference matrix (SM'), an ineffective row (f3nλn) and an ineffective column (fn2λ2) in the reference matrix (SM) that are not used for classifying the defects do not exist in the effective reference matrix (SM'). Here, the ineffective row (f3nλn) is related to a specific factor (f3n), and the ineffective column (fn2λ2) is related to a specific wavelength (λ2).

Thus, effective rows and effective columns are left only in the effective reference matrix (SM'). The effective rows and columns vary in accordance with the wavelengths and inspection conditions.

After the effective reference matrix is formed by the types of the defects, characteristic reference vectors are formed from the effective reference matrix. One characteristic reference vector substantially similar or equal to the characteristic inspection vector is selected among all of the characteristic reference vectors. To select the one characteristic reference vector easily and accurately, the characteristic inspection matrix is transformed into a characteristic inspection matrix with the N'×M' form substantially the same as that of the effective reference matrix. For example, a row or a column in the characteristic inspection matrix, which corresponds to the eliminated row or column in the effective reference matrix, is eliminated to provide the characteristic inspection matrix with the N'×M' form.

The characteristic inspection vector formed from the characteristic inspection matrix may be compared with the characteristic reference vector formed from the characteristic reference matrix in the same manner as that illustrated with reference to FIGS. 13 to 17. The characteristic variations of the defects may be analyzed for coping with situations in which shapes of the defects, processes or properties of layers are changed.

As described above, when more than two vectors selected from the effective reference matrix are compared with the characteristic inspection vectors, a process for detecting and classifying the defects may have an improved reliability. The method of the present invention is very different from a conventional method in which reference information is simply compared with inspection information. According to the method of the present invention, the effective reference matrix includes the characteristics of the reference defects for coping with the situations in which the shapes of the defects, the processes or the properties of layers are changed. The dimension of the effective reference matrix is then aligned with that of the characteristic matrix. The effective reference matrix is compared with the characteristic matrix to analyze the effective reference matrix. And, thus, as described above, the characteristic variations of the defects may be analyzed for coping with situations in which the shapes of the defects, the processes or the properties of the layers are changed.

The above-mentioned methods of detecting and classifying defects include forming the characteristic vector from the characteristic matrix, and comparing the characteristic vector with a reference characteristic vector obtained from the reference matrix. In addition, the methods of the present invention may further include obtaining the eigenvalue and the eigenvector from the characteristic matrix, and comparing the eigenvalue and the eigenvector with the eigenvalue and the eigenvector obtained from the reference vector, thereby detecting and classifying the defects.

The method of obtaining the eigenvalue and the eigenvector is well known to persons skilled in the art. Thus, the detailed illustrations the method is omitted. Hereinafter, a method of detecting and classifying defects using the eigenvalue and the eigenvector is illustrated in more detail with reference to Tables 1 to 4.

TABLE 1

| Defect_ID | Eigenvectors_1 | Eigenvectors_2 | Eigenvectors_3 | Eigenvalues_1 | Eigenvalues_2 | Eigenvalues_3 |
|---|---|---|---|---|---|---|
| D315 | 0.2706 | −0.1423 − 0.5181i | −0.1423 + 0.5181i | 14.7926 | 0 | 0 |
|  | 0.9011 | 0.6896 | 0.6896 | 0 | −0.1603 + 1.0611i | 0 |
|  | 0.3387 | −0.4054 + 0.2673i | −0.4054 − 0.2673i | 0 | 0 | −0.1603 − 1.0611i |
| D317 | 0.2941 | 0.6522 | 0.6522 | 17.8913 | 0 | 0 |
|  | 0.9195 | −0.1599 + 0.5351i | −0.1599 − 0.5351i | 0 | 0.1127 + 1.0692i | 0 |
|  | 0.2608 | −0.2740 + 0.4332i | −0.2740 − 0.4332i | 0 | 0 | 0.1127 − 1.0692i |
| D420 | 0.2278 | 0.1174 − 0.2636i | 0.1174 + 0.2636i | 10.6423 | 0 | 0 |
|  | 0.8212 | 0.7811 | 0.7811 | 0 | −0.6620 + 1.5202i | 0 |
|  | 0.5232 | −0.5536 + 0.0068i | −0.5536 − 0.0068i | 0 | 0 | −0.6620 − 1.5202i |
| D502 | 0.1481 | −0.0018 − 0.4780i | −0.0018 + 0.4780i | 20.1534 | 0 | 0 |
|  | 0.8864 | 0.6435 | 0.6435 | 0 | 0.3042 + 0.8116i | 0 |
|  | 0.4386 | −0.5289 + 0.2786i | −0.5289 − 0.2786i | 0 | 0 | 0.3042 − 0.8116i |
| D424 | −0.1667 | −0.819 | −0.819 | 34.9418 | 0 | 0 |
|  | −0.9602 | 0.3046 − 0.2392i | 0.3046 + 0.2392i | 0 | 0.8563 + 0.3208i | 0 |
|  | −0.2243 | 0.3576 + 0.2267i | 0.3576 − 0.2267i | 0 | 0 | 0.8563 − 0.3208i |
| D429 | −0.1507 | −0.2093 − 0.5551i | −0.2093 + 0.5551i | 25.9687 | 0 | 0 |
|  | −0.9292 | 0.6142 | 0.6142 | 0 | 0.4409 + 0.6881i | 0 |
|  | −0.3373 | −0.3842 + 0.3510i | −0.3842 − 0.3510i | 0 | 0 | 0.4409 − 0.6881i |
| D511 | −0.1618 | −0.1847 − 0.3570i | −0.1847 + 0.3570i | 22.4509 | 0 | 0 |
|  | −0.9185 | 0.7702 | 0.7702 | 0 | −0.2592 + 0.8815i | 0 |
|  | −0.3608 | −0.4558 + 0.1937i | −0.4558 − 0.1937i | 0 | 0 | −0.2592 − 0.8815i |
| D660 | −0.1555 | −0.6706 | −0.6706 | 25.1931 | 0 | 0 |
|  | −0.9278 | −0.0250 − 0.3691i | −0.0250 + 0.3691i | 0 | 0.6952 + 0.3687i | 0 |
|  | −0.3392 | 0.5321 + 0.3609i | 0.5321 − 0.3609i | 0 | 0 | 0.6952 − 0.3687i |

Table 1 shows eigenvalues and eigenvectors obtained from reference matrices, respectively, which are formed with inspection results of scratch defects 620 illustrated in FIG. 14.

As shown in Table 1, each of scratch defects is represented as one real eigenvalue and two imaginary eigenvalues. Further, an eigenvector related to the one real eigenvalue has elements having the same plus or minus value. Furthermore, it can be noted that the eigenvalues have regular '0' values.

TABLE 2

| Defect_ID | Eigenvectors_1 | Eigenvectors_2 | Eigenvectors_3 | Eigenvalues_1 | Eigenvalues_2 | Eigenvalues_3 |
|---|---|---|---|---|---|---|
| D457 | 0.2581 | −0.7114 | −0.7114 | 13.1449 | 0 | 0 |
|  | 0.8762 | −0.0191 − 0.2764i | −0.0191 + 0.2764i | 0 | 0.4419 + 0.3297i | 0 |
|  | 0.4071 | 0.5885 + 0.2663i | 0.5885 − 0.2663i | 0 | 0 | 0.4419 − 0.3297i |
| D432 | −0.1382 | −0.7407 | −0.7407 | 19.3778 | 0 | 0 |
|  | −0.8655 | 0.3874 − 0.3929i | 0.3874 − 0.3929i | 0 | 0.3059 + 0.2211i | 0 |
|  | −0.4815 | 0.2009 + 0.3264i | 0.2009 + 0.3264i | 0 | 0 | 0.3059 − 0.2211i |
| D464 | −0.1409 | 0.3151 + 0.4101i | 0.3151 + 0.4101i | 21.5037 | 0 | 0 |
|  | −0.8918 | −0.7145 | −0.7145 | 0 | 0.1073 + 0.3852i | 0 |
|  | −0.4298 | 0.3750 − 0.2854i | 0.3750 + 0.2854i | 0 | 0 | 0.1073 − 0.3852i |
| D381 | 0.1766 | −0.1386 − 0.3210i | −0.1386 + 0.3210i | 23.0861 | 0 | 0 |
|  | 0.931 | 0.7854 | 0.7854 | 0 | −0.4644 + 1.0932i | 0 |
|  | 0.3195 | 0.4950 + 0.1261i | −0.4950 − 0.1261i | 0 | 0 | −0.4644 − 1.0932i |
| D549 | −0.1468 | −0.0756 − 0.4530i | −0.0756 + 0.4530i | 21.9739 | 0 | 0 |
|  | −0.9017 | 0.6549 | 0.6549 | 0 | 0.2352 + 0.6264i | 0 |
|  | −0.4067 | −0.5221 + 0.2959i | −0.5221 − 0.2959i | 0 | 0 | 0.2352 − 0.6264i |
| D616 | −0.1268 | −0.8402 | 0.1064 | 16.9909 | 0 | 0 |
|  | −0.813 | 0.1289 | −0.795 | 0 | 0.3816 | 0 |
|  | −0.5683 | 0.5268 | 0.5972 | 0 | 0 | −0.3587 |
| D626 | −0.139 | −0.5236 | 0.0082 | 21.9215 | 0 | 0 |
|  | −0.8946 | 0.7962 | −0.786 | 0 | 0.0281 | 0 |
|  | −0.4247 | −0.3031 | 0.6182 | 0 | 0 | −1.2151 |

Table 2 shows eigenvalues and eigenvectors obtained from reference matrices that are formed with inspection results of field collapse defects 920 illustrated in FIG. 17.

As shown in Table 2, each of the field collapse defects is represented as one real eigenvalue and two imaginary eigenvalues similarly to those in Table 1. Further, an eigenvector related to the one real eigenvalue has elements having the same plus or minus value.

When the graph in FIG. 14 is compared with that in FIG. 17, it can be noted that the graph in FIG. 14 is very similar to that in FIG. 17. That is, when the characteristic vector is represented as a graph substantially similar to that in FIG. 14 or FIG. 17, a defect on the semiconductor substrate may be determined as the scratch defect or the field collapse defect.

To accurately classify the defects, eigenvalues and eigenvectors are obtained from other items except for items with respect to noise ratios, signal intensity and noises in each of the reference matrix. The eigenvalues and the eigenvectors are compared with those in a characteristic matrix, respectively. That is, when the eigenvalues and the eigenvectors obtained from the characteristic matrix are compared with those obtained from each of the reference matrices, the types of the defects on the semiconductor substrate may be accurately classified.

TABLE 3

| Defect_ID | Eigenvectors_1 | Eigenvectors_2 | Eigenvectors_3 | Eigenvalues_1 | Eigenvalues_2 | Eigenvalues_3 |
|---|---|---|---|---|---|---|
| D49 | 0.314 | 0.788 | 0.1242 | −18.9414 | 0 | 0 |
|  | 0.9352 | −0.5858 | −0.516 | 0 | 0.1162 | 0 |
|  | −0.1639 | −0.1896 | 0.8475 | 0 | 0 | 3.0973 |
| D407 | 0.3224 | 0.7807 | 0.4723 | −58.3015 | 0 | 0 |
|  | 0.9447 | −0.6 | −0.7145 | 0 | 0.3088 | 0 |
|  | −0.06 | 0.1748 | 0.5162 | 0 | 0 | 3.3469 |
| D591 | 0.3063 | 0.7561 | 0.1799 | −29.2936 | 0 | 0 |
|  | 0.9447 | −0.6374 | −0.5468 | 0 | 0.3181 | 0 |
|  | −0.117 | −0.1485 | 0.8177 | 0 | 0 | 2.9088 |
| D12 | 0.19 | 0.8241 | 0.1105 | −33.5491 | 0 | 0 |
|  | 0.97 | −0.4384 | −0.6196 | 0 | −0.0346 | 0 |
|  | −0.1518 | −0.3586 | 0.7771 | 0 | 0 | 2.9483 |
| D512 | 0.2031 | 0.7528 | 0.192 | −72.4722 | 0 | 0 |
|  | 0.9765 | −0.6576 | −0.5567 | 0 | −0.7418 | 0 |
|  | −0.0722 | −0.0299 | 0.8082 | 0 | 0 | 4.5083 |

Table 3 shows eigenvalues and eigenvectors obtained from reference matrices, respectively, which are formed with inspection results of bridge defects 720 illustrated in the FIG. 15.

As shown in Table 3, each of bridge defects is not represented as an imaginary eigenvalue and an imaginary eigenvector. Further, it can be noted that the elements in the eigenvectors are regularly arranged such as (+, +, −), (+, −, −) and (+, −,+)

TABLE 4

| Defect_ID | Eigenvectors_1 | Eigenvectors_2 | Eigenvectors_3 | Eigenvalues_1 | Eigenvalues_2 | Eigenvalues_3 |
|---|---|---|---|---|---|---|
| D417 | −0.2777 | −0.7018 | 0.0567 | −13.6979 | 0 | 0 |
|  | −0.9369 | 0.7123 | 0.5779 | 0 | 0.054 | 0 |
|  | 0.2126 | 0.0046 | 0.8141 | 0 | 0 | 6.9707 |
| D421 | −0.2732 | −0.6072 | 0.0741 | −12.0871 | 0 | 0 |
|  | −0.9345 | 0.7893 | 0.6289 | 0 | 0.0378 | 0 |
|  | 0.2282 | −0.0906 | 0.774 | 0 | 0 | 7.3983 |
| D427 | −0.2767 | −0.6417 | 0.0661 | −11.8644 | 0 | 0 |
|  | −0.9336 | 0.7653 | 0.6172 | 0 | 0.0658 | 0 |
|  | 0.2279 | −0.0514 | 0.784 | 0 | 0 | 7.2944 |
| D422 | −0.1593 | −0.6977 | 0.0498 | −33.0491 | 0 | 0 |
|  | −0.973 | 0.7129 | 0.63 | 0 | −0.5302 | 0 |
|  | 0.1672 | −0.0707 | 0.775 | 0 | 0 | 12.4955 |
| D527 | −0.1467 | −0.7158 | 0.0631 | −16.9131 | 0 | 0 |
|  | −0.9478 | 0.6955 | 0.5395 | 0 | −0.2561 | 0 |
|  | 0.2832 | −0.0626 | 0.8396 | 0 | 0 | 11.7114 |
| D529 | −0.161 | −0.7376 | 0.071 | −20.1708 | 0 | 0 |
|  | −0.9593 | 0.6741 | 0.6703 | 0 | −0.3687 | 0 |
|  | 0.2322 | −0.0394 | 0.7387 | 0 | 0 | 12.7194 |
| D627 | −0.1516 | −0.7146 | 0.0545 | −20.3727 | 0 | 0 |
|  | −0.9593 | 0.6987 | 0.5979 | 0 | −0.2108 | 0 |
|  | 0.2382 | −0.0351 | 0.7997 | 0 | 0 | 12.543 |

Table 4 shows eigenvalues and eigenvectors obtained from reference matrices, respectively, which are formed with inspection results of particle defects 820 illustrated in the FIG. 16.

As shown in Table 4, each of particle defects is not represented as an imaginary eigenvalue and an imaginary eigenvector. That is, an imaginary value does not exist in the eigenvalue and the eigenvector. Further, it can be noted that elements in the eigenvectors are regularly arranged such as (−, −, +), (−, +, +) and (+, +, +) similarly to that in Table 3.

When the graph in FIG. 15 is compared with that in FIG. 16, it can be noted that the graph in FIG. 15 is different from that in FIG. 16. However, all of graphs on the FIG. 15 are substantially similar to one another. Further, all of graphs on the FIG. 16 are substantially similar to one another. That is, when the characteristic vector is represented as a graph similar to that in FIG. 15, a defect on the semiconductor substrate may be determined as the bridge defect. On the contrary, when the characteristic vector is represented as a graph similar to that in FIG. 16, a defect on the semiconductor substrate may be determined as the particle defect. That is, when the eigenvalues and the eigenvectors obtained from the characteristic matrix are compared with those obtained from each of the reference matrices, the types of the defects on the semiconductor substrate may be accurately classified.

The above-mentioned methods of detecting and classifying the defects include comparing image information with respect to the defects on the substrate with that with respect to the reference defects. Alternatively, when the effective reference matrix and the effective characteristic matrix from which the surrounding eliminated variable factors are used, such as the shapes of the defects, the processes or the properties of the layers, golden images of the reference defects and the actual defects may be obtained. Further, the golden image may be obtained from a light reflected from the substrate from which a noise signal (noise+3σ) is eliminated. The obtained golden image is analyzed to recognize the types of the defects.

According to the present invention, the surrounding variable parameters in the image information, such as the shapes of the defects, the processes or the properties of the layers may be removed using a difference between reactivity of each of the defects in accordance with variations of the wavelengths and inspection conditions. Thus, efficiency of detecting and classifying the defects may be improved. Further, inspection results may have improved reliability. Furthermore, a dependence on the review process is reduced so that a cost for reviewing the detects may be reduced. Particularly, the review process may be automatically carried out so that a line without workers may be designed.

Having described the preferred embodiments for detecting and classifying the defects, it is noted that modifications and variations can be made by persons skilled in the art in light of the above teachings. It is therefore to be understood that changes may be made in the particular embodiment of the present invention disclosed which is within the scope and the spirit of the invention outlined by the appended claims.

What is claimed is:

1. A method of classifying defects on an object, comprising:
    irradiating multi-wavelength light on the object;
    splitting light reflected from the object into light beams, each of the light beams having different wavelengths;
    obtaining image information of the object based on each of the light beams;
    forming a characteristic matrix that represents the wavelengths and the image information; and
    analyzing the characteristic matrix to determine types of the defects on the object.

2. The method of claim 1, wherein the multi-wavelength light comprises light beams having the different wavelengths, the light beams having substantially parallel paths.

3. The method of claim 1, wherein splitting the light comprises individually collecting the light beams, having the different wavelengths, reflected from the object.

4. The method of claim 3, further comprising moving the object by an interval between the light beams to sequentially irradiate the light beams onto a substantially same position on the object.

5. The method of claim 1, wherein the characteristic matrix is formed by arranging factors that are included in the image information distributed in accordance with the different wavelengths.

6. The method of claim 5, wherein the factors comprise contrasts of the light beams, polarities of the light beams, sizes of the defects, statistical values of the light beams, background information of the object, signal intensity of the light beams, noise information in the light beams, and at least two combinations thereof.

7. A method of classifying defects on an object, comprising:
    irradiating multi-wavelength light on the object;
    splitting light reflected from the object into light beams, each of the light beams having different wavelengths;
    obtaining image information of the object based on each of the light beams;
    forming a characteristic matrix that represents the wavelengths and the image information; and
    analyzing the characteristic matrix to determine types of the defects on the object, wherein determining the types of the defects comprises:
    comparing the characteristic matrix with predetermined reference matrices;
    selecting a reference matrix among all of the reference matrices that is substantially similar to the characteristic matrix;
    finding a type of a reference defect corresponding to the selected reference matrix; and
    determining the types of the defects based on the found type of the reference defect.

8. The method of claim 7, wherein the characteristic matrix is compared with the predetermined reference matrices using a thumb print algorithm, a nearest neighbor algorithm, a decision tree algorithm, a rule-based classification algorithm, or a combination thereof.

9. The method of claim 7, further comprising forming the reference matrices, wherein forming the reference matrices comprises:
    i) irradiating the multi-wavelength light onto a first reference defect on a reference object;
    ii) splitting light reflected from the first reference defect into reference light beams each having different wavelengths to obtain first reference image information;
    iii) arranging factors, which are included in the first reference image information, by the different wavelengths to form a first reference matrix; and
    iv) repeating the steps i) to iii) with respect to another reference defect different from the first defect.

10. The method of claim 9, wherein the factors comprise contrasts of the reference light beams, polarities of the light beams, sizes of the reference defects, statistical value of the light beams, background information of the reference object, signal intensity of the light beams, noise information in the light beams, and at least two combinations thereof.

11. he method of claim 7, wherein comparing the characteristic matrix with the predetermined reference matrices comprises comparing at least two column vectors, which are selected among all column vectors in the characteristic matrix, with at least two column vectors that are selected among all column vectors in each of the predetermined reference matrices.

12. The method of claim 7, wherein comparing the characteristic matrix with the predetermined reference matrices comprises comparing at least two row vectors, which are selected among all row vectors in the characteristic matrix, with at least two row vectors that are selected among all row vectors in each of the predetermined reference matrices.

13. The method of claim 7, wherein comparing the characteristic matrix with the predetermined reference matrices comprises:
   obtaining an eigenvalue and an eigenvector from the characteristic matrix;
   obtaining an eigenvalue and an eigenvector from each of the predetermined reference matrices; and
   comparing the eigenvalue and the eigenvector obtained from the characteristic matrix with the eigenvalue and the eigenvector obtained from each of the reference matrices.

14. The method of claim 7, wherein determining the types of the defects comprises:
   comparing the predetermined reference matrices with each other to find components in the predetermined reference matrices having a substantially same value;
   substituting the components with '0' values;
   eliminating a column or a row having all components that are substituted with the '0' values in the predetermined reference matrices to transform the reference matrices into effective reference matrices;
   comparing the characteristic matrix with the effective reference matrices;
   selecting an effective reference matrix among all of the effective reference matrices that is substantially similar to the characteristic matrix;
   finding a type of a predetermined reference defect corresponding to the selected effective reference matrix; and
   determining the types of the defects based on the type of the effective reference defect.

15. The method of claim 14, wherein comparing the characteristic matrix with the effective reference matrices comprises comparing at least two column vectors, which are selected among all column vectors in the characteristic matrix, with at least two column vectors that are selected among all column vectors in each of the effective reference matrices.

16. The method of claim 14, wherein comparing the characteristic matrix with the effective reference matrices comprises comparing at least two row vectors, which are selected among all row vectors in the characteristic matrix, with at least two row vectors that are selected among all row vectors in each of the effective reference matrices.

17. The method of claim 14, wherein comparing the characteristic matrix with the effective reference matrices comprises:
   obtaining an eigenvalue and an eigenvector from the characteristic matrix;
   obtaining an eigenvalue and an eigenvector from each of the effective reference matrices; and
   comparing the eigenvalue and the eigenvector obtained from the characteristic matrix with the eigenvalue and the eigenvector obtained from each of the effective reference matrices.

* * * * *